United States Patent

Betz

[15] 3,705,295

[45] Dec. 5, 1972

[54] CONVERSION SYSTEM

[72] Inventor: Bernard K. Betz, Hennepin, Minn.

[73] Assignee: Honeywell Inc., Minneapolis, Minn.

[22] Filed: Feb. 8, 1971

[21] Appl. No.: 113,663

Related U.S. Application Data

[63] Continuation of Ser. No. 773,678, Nov. 5, 1968, abandoned.

[52] U.S. Cl.........235/92 PL, 235/92 EV, 235/92 PE, 235/92 CC, 328/44, 235/92 R

[51] Int. Cl...........................H03k 21/02, G06m 3/14

[58] Field of Search...340/347 DD; 235/155, 156, 92 PL, 235/92 PE, 92 CP, 92 CC, 92 CV, 92 GC, 92 V, 92 EA, 92 EV; 328/44

[56] References Cited

UNITED STATES PATENTS

| | | | |
|---|---|---|---|
| 3,209,130 | 9/1965 | Schmidt | 235/92 PL |
| 3,549,870 | 12/1970 | Lay | 235/92 PL |
| 3,571,575 | 3/1971 | Barr et al. | 235/92 PL |

*Primary Examiner*—Daryl W. Cook
*Assistant Examiner*—Joseph M. Thesz, Jr.
*Attorney*—Lamont B. Koontz and Omund R. Dahle

[57] ABSTRACT

A system for converting electrical input pulses generated by an input pulse source to a predetermined unit of measure. Electronic scalers, triggered by the input pulses, sequentially generate a preselected number of output pulses. In the conversion system each output pulse represents a fixed integral number. The conversion factor per pulse is the total of output pulses divided by the number of input pulses.

17 Claims, 4 Drawing Figures

INVENTOR.
BERNARD K. BETZ
BY [signature]
ATTORNEY

INVENTOR.
BERNARD K. BETZ

BY Oliver F. Arrett

ATTORNEY.

CONVERSION SYSTEM

This application is a continuation of Ser. No. 773 678, filed Nov. 5, 1968, now abandoned.

BACKGROUND OF THE INVENTION

This invention relates broadly to a conversion system for obtaining a desired conversion factor. One application of this conversion system is to convert the electrical pulses generated by a laser interferometer to an equivalent readout in engineering units. In the prior art, a desired conversion factor is obtained by one of two methods. In a brute force method, the conversion system continuously adds or subtracts the appropriate conversion factor as each input count is received. In a second method, the conversion factor is achieved by accumulating the number of input counts and then multiplying the total number of input counts by the appropriate conversion factor. Both of these methods involve difficult manipulation with large numbers when an accurate readout is desired. This necessitates sophisticated and expensive apparatus.

SUMMARY OF THE INVENTION

The present invention achieves the appropriate conversion factor by sequential algebraic addition. In the basic embodiment, count transmission means transmit input counts generated by an input count source to a count receiving means. The input counts are also transmitted to a supplemental count generating and transmitting means which recurrently generate and transmit to the count receiving means an additional count on receiving a predetermined number of counts from the input count source. The number of counts generated by the supplemental generating means is a fractional multiple of the number of counts generated by the input count source.

The count receiving means normally includes an accumulator wherein the counts transmitted to the accumulator by the input count transmission means are algebraically added to the counts transmitted to the accumulator by the supplemental transmission means. To prevent counts transmitted by the input count transmission means and the supplemental transmission means from arriving at the accumulator simultaneously, delay means are associated with at least one of the transmission means. In the accumulator each count represents a fixed integer. Since the total number of counts transmitted to the accumulator for each input count can be varied, any desired integral or non-integral conversion factor can be obtained. Utilizing this method, the conversion system provides the desired conversion factor utilizing substantially less sophisticated apparatus than is necessary in the prior art.

BRIEF DESCRIPTION OF THE DRAWING

For a better understanding of the invention, reference should be had to the accompanying drawing wherein.

DESCRIPTION OF THE PREFERRED EMBODIMENT

Figures 1, 2, 3:
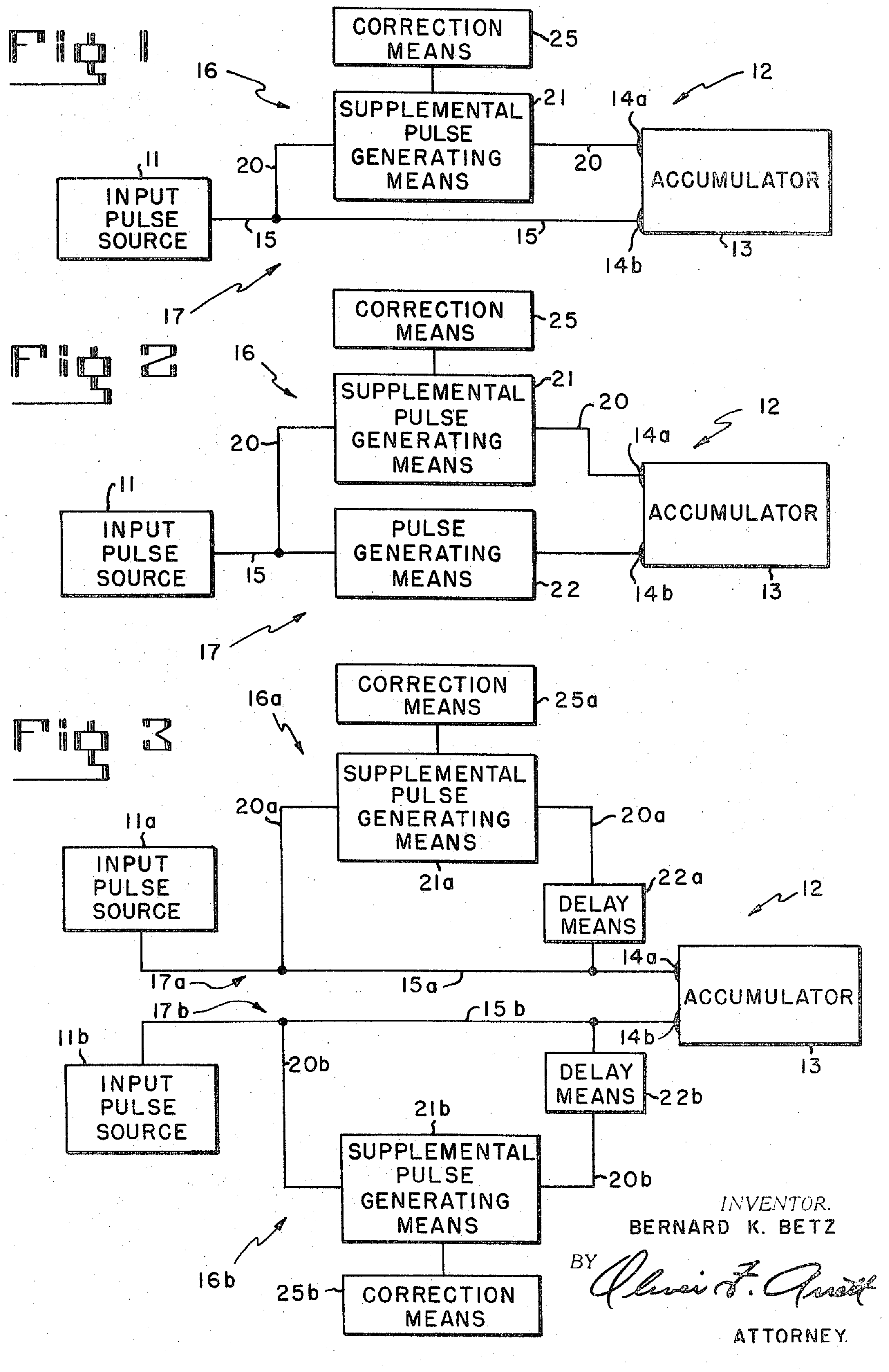
FIG. 1 is a diagramatical illustration of a single channel conversion system.
FIG. 2 is a diagramatical illustration of a single channel conversion system including a second pulse generating means.
FIG. 3 is a diagramatical illustration of a two channel conversion system adapted to receive an input from two different input sources.

FIG. 1 illustrates the basic embodiment of the conversion system. In this embodiment, the "counts" generated by count or pulse source 11 and by supplemental count or pulse generating means 21 may be any physical phenomena having a discrete value or frequency of occurrence which is to be converted to a predetermined readout unit. For example, the input counts could be electrical or fluidic pulses. In the description of the embodiment illustrated in FIG. 1 and also in the description of the embodiments illustrated in FIGS. 2–4, the "counts" are in the form of electrical pulses for explanatory purposes. Thus, the apparatus comprising the conversion systems illustrated in FIGS. 1–4 is hereinbelow referred to in terms of the appropriate electrical terminology.

First logic channel 17 comprises input pulse transmission means 15 and supplemental pulse generating and transmitting means, generally designated 16. The pulse transmission means is shown simply as lead 15. However, the transmission means can include a pulse generating means as described in conjunction with FIG. 2. In the embodiment illustrated in FIG. 1, supplemental pulse generating and transmission means 16 comprises: a supplemental pulse transmission means, shown as lead 20; a supplemental pulse generating means 21 described herein as a single electronic scaler, the construction of which is well known in the art when components such as Sylvania Model No. SF53 flip-flops are utilized; and correction means 25 associated with scaler 21. The correction means can be a manually or electronically operated bank of switches which preset scaler 21 to a predetermined number each time the scaler recycles.

Lead 15 transmits the electrical input pulses generated by input pulse source 11 to the pulse receiving means, generally designated 12, shown comprising an accumulator 13 and accumulator terminals **14*a* and 14*b*. The input pulses generated by input pulse source 11 are also transmitted to scaler 21 by lead 20. Scaler 21 recurrently generates and transmits an additional electrical pulse to accumulator 13 after receiving a predetermined number of input pulses. In this embodiment, accumulator 13 can be either a unidirectional accumulator such as a Beckman Model 6004 accumulator or it can be bidirectional such as a Beckman Model 6013 accumulator. Accumulator 13** is adapted to register or display the readout in a predetermined unit of measure.

In operation, each electrical input pulse generated by input pulse source 11 is transmitted to accumulator terminal **14*b* by lead 15. The input pulses are also transmitted by leads 15 and 20 to electronic scaler 21. Scaler 21 then recurrently generates an additional pulse after a predetermined number of input pulses are generated by input source 11. These additional pulses are transmitted to accumulator terminal 14*a* by lead 20. The number of pulses generated by scaler 21 is a fractional multiple of the number of pulses generated by input pulse source 11. For example, if electronic scaler 21 is a 4:1 scaler, a pulse is generated by scaler 21 after four pulses have been generated by input pulse source 11. In this example, the fractional multiple of additional pulses generated by scaler 21 is one fourth and the fractional multiple of output pulses transmitted to accumulator 13** by the conversion system is five fourths the number of input pulses.

Accumulator 13 algebraically adds the pulses transmitted to terminal 14*a* and 14*b* by the leads 15 and 20. That is, the number of pulses that accumulator 13 receives from lead 20 are either added to or subtracted from the number of pulses transmitted by lead 15. In accumulator 13, each pulse represents a fixed number in the unit of measure to which the input pulses are to be converted. This number, the "least unit" of the accumulator, is normally chosen for convenience. For example, if accumulator 13 registers 10 units for each pulse transmitted to the accumulator by leads 15 and 20, the "least unit" of accumulator 13 is 10. Using a least unit of 10 in the example where scaler 21 is a 4:1 scaler, then for every four pulses generated by input pulse source 11, five pulses, equivalent to 50 units, are received by accumulator 13. For this example, the average value registered by accumulator 13 per input pulse is 12.50 units.

The supplemental pulse generating means has been described as consisting of one scaler. However the supplemental generating means may include several scalers, each generating an additional pulse after a predetermined number of input pulses unique to each scaler have been generated by the input pulse source. The total number of output pulses transmitted to accumulator 13 by the conversion system remains a fractional multiple of the number of input pulses generated by pulse source 11.

Correction means 25, shown associated with scaler 21, can be added to the converter system if pulse source 11 is condition sensitive. For example, physical conditions, such as temperature and pressure, may cause an undesired variation in the number of pulses generated by the condition sensitive input pulse source. Correction means 25 can either manually or automatically compensate for such a nondesired effect by resetting scaler 21 to a non-zero value. This varies the number of input pulses which must be generated by input pulse source 11 before scaler 21 generates an additional pulse. For example, if scaler 21 is a 4:1 scaler, correction means 25 may reset the scaler, upon recycling, to one rather than zero such that scaler 21 now generates a pulse after receiving three input pulses.

Figure 4:
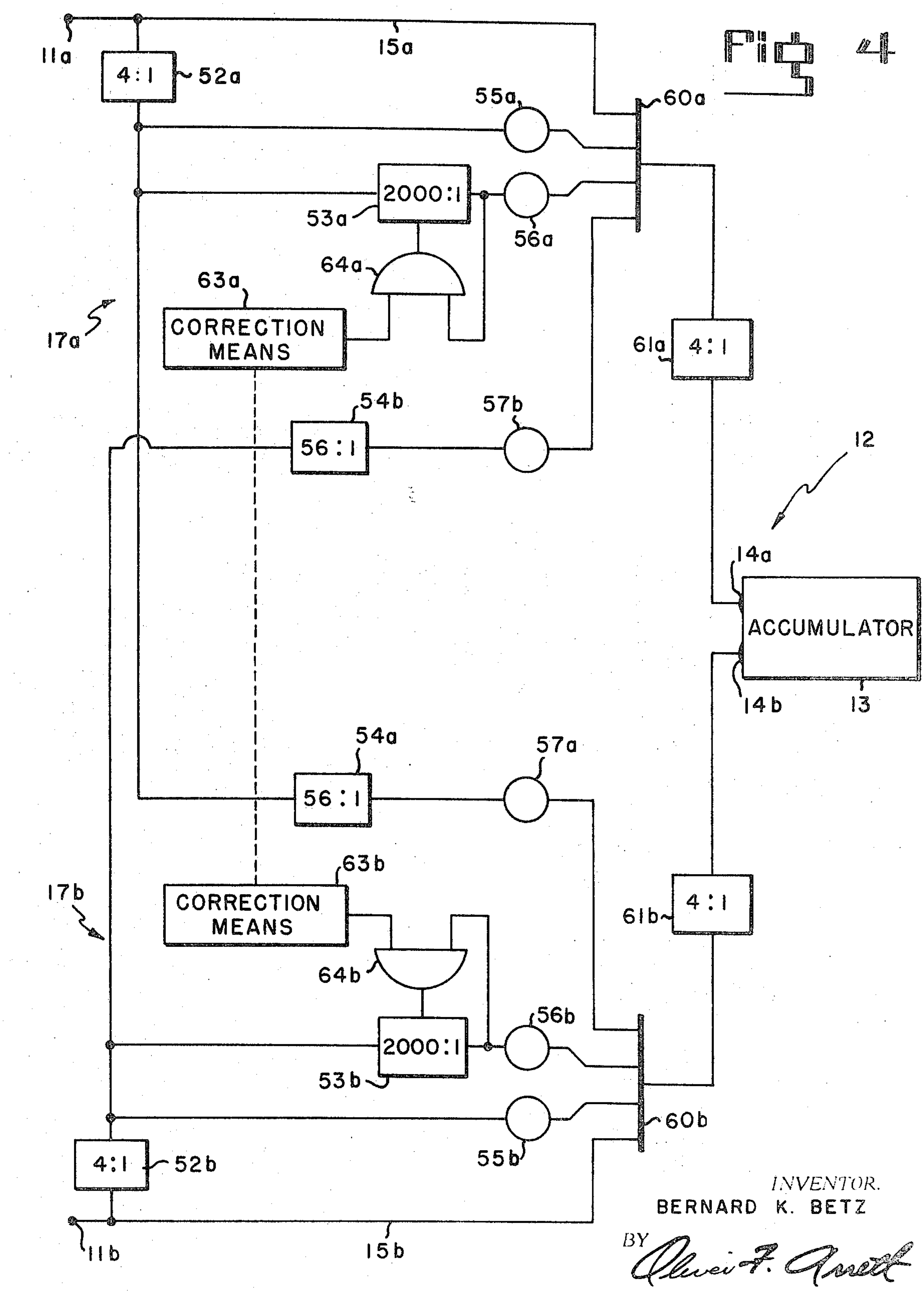
FIG. 4 is a diagramatical illustration of a specific converter providing fringe-to-microinch conversion in a laser interferometer system.

In FIGS. 2–4, the same reference numerals as used in FIG. 1 are used to identify corresponding elements respectively. Furthermore, corresponding elements in logic channels 17*a* and 17*b* have been given the same reference numerals followed by "a" and "b" respectively.

The conversion system illustrated in FIG. 2 is identical to the system described in conjunction with FIG. 1 except that the input pulse transmission means now comprises lead 15 and a pulse generating means 22, whereas in FIG. 1 the transmission means was described as comprising only lead 15. Pulse generating means 22 can be a single electronic scaler similar in construction to scaler 21, but possibly providing an output pulse after receiving a different number of input pulses than is necessary to cause scaler 21 to generate an output pulse. For example, scaler 21 can be a 4:1 scaler and scaler 22 an 8:1 scaler. In this example, the total number of output pulses received by accumulator 13 is three-eighths of the number of input pulses generated by pulse course 11. If the "least unit" of accumulator 13 is again 10, then accumulator 13 will register an average of 0.3750 units per input pulse from source 11.

The conversion system illustrated in FIG. 3 has two logic channels, channel 17*a* and channel 17*b*. Each channel is shown with its own input pulse source, channel 17*a* having input pulse source 11*a* and channel 17*b* having input pulse source 11*b*. As shown, channels 17*a* and 17*b* are identical to channel 17 of FIG. 1 with the exception that leads 10*a* and 10*b* include delay means 22*a* and 22*b*, respectively, which may be monostable multi-vibrators well known in the art. Multivibrator 22*a* prevents a pulse transmitted by lead 15*a* and a pulse generated by scaler 21*a* from reaching terminal 14*a* simultaneously. Multivibrator 22*b* prevents a pulse transmitted by lead 15*b* and a pulse generated by scaler 21*b* from reaching terminal 14*b* simultaneously. The pulses transmitted to the terminals are algebraically added by the accumulator to provide a readout in a predetermined unit of measure.

In the embodiment illustrated in FIG. 3, is is apparent that the additional pulses generated by scalers 21*a* and 21*b* will be counted by the scalers the same as an input pulse from source 11. This reduces the number of input pulses which must be generated by source 11 before scalers 21*a* and 21*b* generate an additional pulse. Thus, it may be necessary to include blocking diodes (not shown) in leads 15*a* and 15*b* to prevent this additional counting from occurring unless the appropriate conversion factor can be conveniently and efficiently obtained even though scalers 21*a* and 21*b* do count their own pulses.

It is evident that it is within the scope of this invention to add additional logic channels and to add additional scalers to each of the channels. Furthermore, it is evident that many conversion factors can be most efficiently achieved by a combination of sequential addition and subtraction of the pulses generated by the pulse generating means. In such cases it is most advantageous to use a bidirectional accumulator.

The embodiment illustrated in FIG. 4 is a specific converter for application in a laser interferometer system, such as described in an article entitled "The Laser Interferometer" by J. P. Engeman, appearing in the June, 1967, *Electronics World*. The laser interferometer (not shown) produces a ring fringe pattern that falls on a fringe dissector which transmits the central part of the fringe pattern to a first photomultiplier while the outer portion of the fringe pattern is reflected to a second photomultiplier. Each photomultiplier generates an electrical pulse on the occurrence of each dark to light fringe, one pulse leading or lagging the other depending upon the direction of motion of the interferometer's traverse mirror. These pulses are shaped into square waves by a Schmidt trigger circuit and are directed to either channel 17*a* or 17*b*, whichever channel is appropriate, by a steering logic circuit (not shown) comprising an arrangement of "flip-flops" and "and" gates well known in the art. For purposes of discussion, assume that the pulses directed to input terminal 11*a* by the steering logic circuit represents motion of the interferometer's traverse mirror in a positive direction while pulses directed to input terminal 11*b* represent motion in a negative direction. For use in an interferometer system, channels 17*a* and 17*b* are identical. Thus, it is necessary to describe only channel 17*a*.

A meaningful unit of measure for the amount of movement of the interferometer's traverse mirror is inches. If the readout is chosen to be in inches, the desired conversion factor at standard temperature and pressure is 12.457080 microinches for each pulse generated by the interferometer system. That is, the light-to-dark fringes causing the photomultipliers to produce electrical pulses are separated by a distance of one-half wavelength which is equal to 12.457080 microinches at standard temperature and pressure for a HeNe laser.

To achieve the desired conversion factor, channel 17*a* employs three electronic scalers 52*a*, 53*a* and 54*a*. Monostable multivibrators 55*a*, 56*a* and 57*b* prevent the pulses generated by the electronic scalers and the pulses transmitted by lead 15*a* from reaching common terminal 60*a* simultaneously. For example, multivibrator 55*a* may provide a 0.5 microsecond delay, multivibrator 56*a* a 1 microsecond delay and multivibrator 57*b* a 1.5 microsecond delay. A differentiating circuit (not shown) can be placed in lead 15*a* (and 15*b*) to sharpen the pulse received by input terminal 11*a* (and 11*b*) thus reducing the amount of time the multivibrators must delay the pulses generated by the electronic scalers. This increases the frequency response of accumulator 13.

Correction means 63*a* corrects for undesired changes in the number of electrical pulses generated by the interferometer system caused by changes in the wavelength of the HeNe laser. A variation in the temperature and/or pressure of the medium through which the laser beam propagates causes a change in the wavelength of the laser beam. This makes it necessary to correct the conversion factor since the distance between the light-to-dark fringes changes along with the change in wavelength of the laser beam. The correction is obtained by having gate 64*a* reset scaler 53*a* to a variable, non-zero number after it has received pulses from both correction means 63*a* and scaler 53*a*. This varies the number of pulses which must be generated by the interferometer before scaler 53*a* generates a pulse and recycles. The range of this variation can be made sufficient to compensate for the change in wavelength of the laser beam over a wide temperature and pressure range.

In operation, pulses directed to input terminal 11a are transmitted by lead 15*a* to a common terminal 60*a*, scaler 61a and then to reversible accumulator 13. The input pulses received by terminal 11a are also transmitted to: scaler 52*a*, a 4:1 scaler; scaler 53*a*, a 2000:1 scaler; and scaler 54*a*, a 56:1 scaler. Scaler 61*a*, a 4:1 scaler, is necessary to correct for the wave shaping and steering circuits generating four pulses for each half wavelength (i.e., each fringe), whereas the logic of the converter system is based on one pulse for each half wavelength. Waveshaping and directing circuits could be utilized which only generate one pulse for each half wavelength and thus remove the need for scalers 61*a* and 61*b*. However, this would reduce the resolution of the inteferometer system and therefore it is desirable that the converter be constructed as illustrated. In this embodiment, the "least unit" of accumulator 13 is chosen to be 10 microinches for reasons which will become apparent hereinbelow.

Scaler 52*a*, a 4:1 scaler, generates and transmits an addition pulse to terminal 60*a* upon every fourth pulse being received by terminal 11*a*. Thus, five pulses are transmitted to the accumulator for the first four input pulses generated by the interferometer. This provides an average of 12.500000 microinches per input pulse. Since this is higher than the desired conversion factor, scaler 54*a*, a 56:1 scaler in series with scaler 52*a*, adds a pulse to channel 17*b* after every 224th input pulse. Since this is equivalent to subtracting 10 microinches from channel 17*a* after every 224th input pulse, scaler 54*a* contributes an average of –0.0446420 microinches per input pulse so that the net result is 12.455358 microinches. Since this is now lower than the desired conversion factor, an extra 10 microinches must be added recurrently to channel 17*a*. Scaler 53*a* provides the final addition. This final addition is variable, occurring after a predetermined pulse between the four thousandth and eight thousandth input pulse at terminal 11*a*. This variation is achieved by correction means 63*a* resetting scaler 53*a*, a 2000:1 scaler, in series with scaler 52*a*, a 4:1 scaler, to an appropriate non-zero number. "And" gate 64*a* allows correction means 63*a* to reset scaler 53*a* only after scaler 53*a* has generated and transmitted a pulse to accumulator 13. This variable resetting of scaler 53*a* is sufficient to compensate for changes in pressure and temperature over the range in which the interferometer system will be operated.

Channel 17*b* is identical to channel 17*a* and provides pulses to accumulator terminal 14b when the direction of the interferometer's traverse mirror is in a negative direction. Reversible accumulator 13 then subtracts the pulses received by terminal 14b from the pulses received by terminal 14*a* and displays an output reading in microinches. Since input terminals 11a and 11b are receiving pulses from the same interferometer system, the correction for variations in temperature and pressure causing an undesired change in the frequency of input pulses is identical for both channels. Thus, the switches comprising correction means 63*a* and 63*b* are ganged.

Each of the scalers in the conversion system can accumulate a maximum value of up to slightly less than one pulse before recycling occurs (e.g., seven-eighths of a pulse for an 8:1 scaler). The amount accumulated represents an error unless the user of the converter has access to the scalers. Since the value registered by any one scaler is independent of the value registered by the other scalers, it is possible to have an arrangement in which each of the scalers assumes its maximum value simultaneously. If the accumulator is unidirectional, this situation provides a maximum error in the number of pulses transmitted to the accumulator. This maximum error is equal to slightly less than the number of scalers in the conversion system. However, if the accumulator is bidirectional, the maximum error occurs in an arrangement in which all the scalers contributing positive pulses to the accumulator assume their maximum values at the moment when all the scalers contributing negative pulses to the accumulator are at their minimum value (normally zero) or, of course, vice versa. Here, the maximum error in pulses transmitted to the accumulator is slightly less than the number of scalers contributing positive or negative pulses, whichever type of scaler is the more numerous.

It is readily apparent that the error introduced by each scaler can be reduced by proper choice of scalers and of the "least unit" of the accumulator. In the case where the accumulator is unidirectional, the error can be further reduced by presetting each of the scalers to as near to one half of their maximum value as possible for the first cycle of the conversion process. In this case, the error introduced by each scaler then varies between $-\frac{1}{2}$ and $+\frac{1}{2}$ of a count rather than between 0 and 1 as for the case without presetting and thus the error is reduced by approximately one half. Presetting also aids the case where the accumulator is bidirectional provided the number of scalers contributing positive pulses does not equal the number of scalers contributing negative pulses to the accumulator. However, presetting does not aid the bidirectional accumulator case if there are an equal number of positive and negative scalers. In this case, the maximum error that can be introduced into the system without presetting is approximately equal to the number of positive or negative scalers. However, this is equal to the error that can be introduced into the system with presetting since then it is possible to have the situation in which each scaler simultaneously assumes the value of $\pm\frac{1}{2}$. In any case, the advantages provided by the conversion system of the present invention greatly outweigh the fact that a minimal error is inherant to the system.

While this invention has been disclosed with reference to a series of preferred embodiments, it should be understood by those skilled in the art that changes in form and detail may be made without departing from the spirit and scope of the invention.

The embodiments of the invention in which an exclusive property or right is claimed are defined as follows:

1. A conversion system for converting electrical pulses as input counts generated by a first input count source and by a second input count source into a number representing a value in a predetermined unit of measure, the system comprising:

count receiving means for providing an output representing the total of counts previously received which includes an accumulator having first and second accumulator terminals each being adapted to receive electrical pulses as counts whereby said accumulator subtracts the number of said counts received by said second accumulator terminal from the number of said counts received by said first accumulator terminal;

first input count transmission means for transmitting electrical pulses as said input counts generated by said first input count source to said count receiving means;

second input count transmission means for transmitting electrical pulses as said input counts generated by said second input count source to said count receiving means;

first supplemental count generating and transmission means which includes:

a first electronic scaler connected to said first accumulator terminal for recurrently generating an additional electrical pulse as a said count on receiving a first predetermined number of electrical pulses as said input counts from said first input count source, a second electronic scaler connected to said second accumulator terminal for recurrently generating an additional electrical pulse as a said count upon receiving a second predetermined number of electrical pulses as said input counts from said first input count source, and a third electronic scaler connected to said first accumulator terminal for recurrently generating an additional electrical pulse as a said count upon receiving a third predetermined number of electrical pulses as said input counts from said first input count source; and second supplemental count generating and transmission means which includes:

a first electronic scaler connected to said second accumulator terminal for recurrently generating an additional electrical pulse as a said count upon receiving a first predetermined number of electrical pulses as said input counts from said second input count source, a second electronic scaler connected to said first accumulator terminal for recurrently generating an additional electrical pulse as a said count upon receiving a second predetermined number of electrical pulses as said input counts from said second input count source, and a third electronic scaler connected to said second accumulator terminal for recurrently generating an additional electrical pulse as a said count upon receiving a third predetermined number of electrical pulses as said input counts from said second input count source.

2. The conversion system defined in claim 1 wherein at least one of the electronic scalers includes correction means to vary the fractional multiple of pulses generating and transmitting to the count receiving means.

3. A conversion system for converting input counts generated by a first input count source into a number representing a value in a predetermined unit of measure, the system comprising:

count receiving means for providing an output representing a total of the number of counts previously received having as count receiving means inputs a count addition input to receive counts to increase said total and a count subtraction input to receive counts to decrease said total;

input count transmission means for transmitting said input counts generated by said input count source as transmitted counts to one of said count receiving means inputs; and supplemental count generating and transmission means adapted to receive said input counts from said input count source for generating first additional counts, one of said first additional counts being generated upon each reception of a first predetermined number of said input counts from said input count source, and transmitting said first additional counts to other said count receiving means input, whereby said transmitted counts and said first additional counts will cause said total to change in opposite directions.

4. The system of claim 3 wherein said supplemental count generating and transmission means generates second additional counts, one of said second additional counts being generated upon each reception of a second predetermined number of said input counts from said input count source, and transmits said second additional counts to said count receiving means input receiving said transmitted counts.

5. The system of claim 3 wherein said input count transmission means includes a pulse generating means adapted to receive said input count from said input count source for generating one of said transmitted counts upon each reception of a second predetermined number of said input counts from said input count source.

6. The system of claim 3 wherein said input count source is condition sensitive and said supplemental count generating and transmission means includes correction means to vary the magnitude of said first predetermined number to thereby correct for changes in conditions affecting said input count source.

7. The system of claim 3 wherein said count receiving means includes an accumulator to provide said total of the number of counts previously received.

8. The system of claim 3 wherein delay means are associated with at least one of said input count transmission means and said supplemental count generating and transmission means to prevent said transmitted counts from arriving at said count receiving means simultaneously with said first additional counts.

9. The system of claim 3 wherein said input counts, said transmitted counts and said first additional counts are electrical pulses.

10. A conversion system for converting input counts generated by a first input count source and by a second input count source into a number representing a value in a predetermined unit of measure, this system comprising:

count receiving means for providing an output representing a total of the number of counts previously received having as count receiving means inputs a count addition input to receive counts to increase said total and a count subtraction input to receive counts to decrease said total;

first input count transmission means for transmitting said input counts generated by said first input count source as first transmitted counts to one of said count receiving means inputs;

second input count transmission means for transmitting said input counts generated by said second input count source as second transmitted counts to other said count receiving means input;

first supplemental count generating and transmission means adapted to receive said input counts from said first input count source for generating first additional counts, one of said first additional counts being generated upon each reception of a first predetermined number of said input counts from said first input count source, and transmitting said first additional counts to said count receiving means input receiving said second transmitted counts; and second supplemental count generating and transmission means adapted to receive said input counts from said second input count source for generating second additional counts, one of said second additional counts being generated upon each reception of a second predetermined number of said input counts from said second input count source, and transmitting said second additional counts to said count receiving means input receiving said first transmitted counts.

11. The system of claim 10 wherein said first supplemental count generating and transmission means generates third additional counts, one of said third additional counts being generated upon each reception of a third predetermined number of said input counts from said first input count source, and transmits said third additional counts to said count receiving means input receiving said first transmitted counts and wherein said second supplemental count generating and transmission means generates fourth additional counts, one of said fourth additional counts being generated upon each reception of a fourth predetermined number of said input counts from said second input count source, and transmits said fourth additional counts to said count receiving means input receiving said second transmitted counts.

12. The system of claim 10 wherein said first predetermined number of said input counts equals said second predetermined number of said input counts.

13. The system of claim 10 wherein said first input count transmission means includes a pulse generating means adapted to receive said input counts from said first input count source for generating one of said first transmitted counts upon each reception of a third predetermined number of said input counts from said first input count source and wherein said second input count transmission means includes a pulse generating means adapted to receive said input counts from said second input count source for generating one of said second transmitted counts upon each reception of a fourth predetermined number of said input counts from said second input count source.

14. The system of claim 10 wherein said first and second input count sources are condition sensitive and said first and second supplemental count generating and transmitting means include correction means to vary the magnitude of said first and second predetermined numbers to thereby correct for changes in conditions affecting said first and second input count sources.

15. The system of claim 10 wherein said count receiving means includes an accumulator to provide said total of the number of counts previously received.

16. The system of claim 10 wherein delay means are associated with members of at least one of a first and a second group, said first group containing as said members said first and second input count transmission means and said second group containing as said members said first and second supplemental count generating and transmission means, to prevent said first and second transmitted counts from arriving at said count receiving means simultaneously with said first and second additional counts.

17. The system of claim 10 wherein said input counts, said first and second transmitted counts and said first and second additional counts are electrical pulses.

* * * * *